March 17, 1931. G. C. GOCHNAUER 1,797,137
METHOD OF PACKING GROUND MEAT
Filed March 22, 1930

Inventor
GEORGE C. GOCHNAUER.
By James P. Burns
Attorney

Patented Mar. 17, 1931

1,797,137

UNITED STATES PATENT OFFICE

GEORGE C. GOCHNAUER, OF CAMP HILL, PENNSYLVANIA

METHOD OF PACKING GROUND MEAT

Application filed March 22, 1930. Serial No. 438,133.

This invention relates to a method for packing ground meat, such as sausage meat and the like.

Sausage meats have for years been packed in so-called casings, usually in the form of portions of animals' intestines. Of recent years, other types of casings have been adopted which are more sanitary and which obviate the cleaning process necessary to prepare the previously used casings for use.

The present invention comprises a process embracing the use of a casing of a type which is sanitary and economical. In its more specific aspect, the invention contemplates packing the meat in a casing formed of an absorbent material such as parchment paper, a moisture absorbent cellulose ester known as "cellophane", or the like.

The process further contemplates a mode of operation by which the casing is sealed along its meeting edges by the moisture and adhesive properties of the meat being packed.

Further advantageous features of the process will be apparent as the detailed description thereof proceeds.

To the end that the invention may be more readily understood, drawings accompany this application, diagrammatically illustrating the method.

In the drawings, Figure 1 is a view in side elevational of a stuffing tube for packing ground meat of more or less conventional design.

Figure 1:
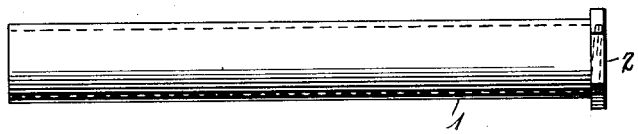
Figure 2:
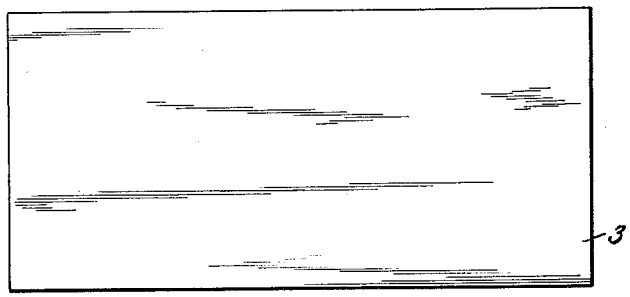
Figure 2 is a view of a blank of material adapted to be formed into a casing.

Referring to Figure 1, there is shown a conventional stuffing tube 1, which may be formed from monometal or the like. This tube is annular and is provided at one end with a threaded shoulder 2 by which it is attached to a conventional type of stuffing machine not shown. It will be understood that such a stuffing machine embraces feeding mechanism for impelling passage of ground meat through the tube 1 under some pressure. A rectangular blank of casing material 3 is shown in Figure 2, which blank is adapted to be wrapped about the tube 1 in a manner to be presently described.

Figure 3:
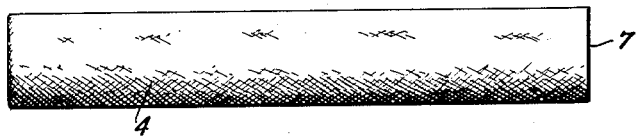
Figure 3 is a view of a cloth bag which is utilized in the method.

In Figure 3 there is disclosed a cloth bag 4 of slightly larger diameter than the stuffing tube 1. This bag is preferably of sufficient strength to withstand any pressures or strains incident to the packing of the meat.

Figures 4, 5:
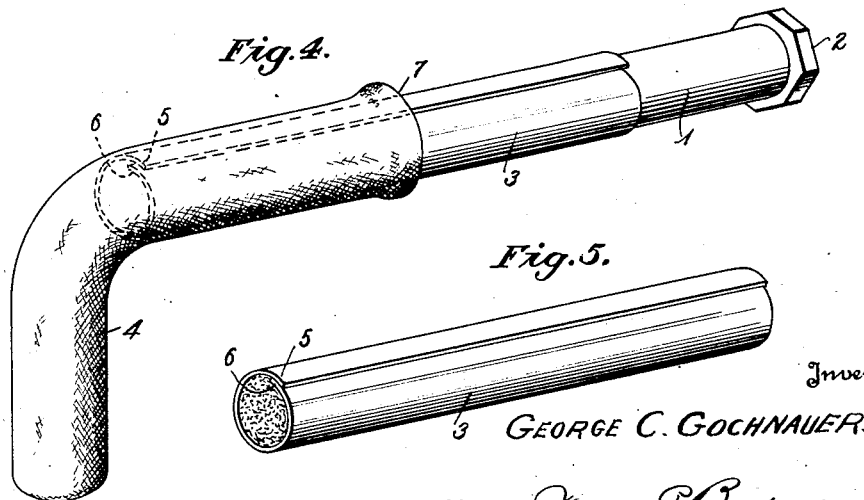
Figure 4 is a view showing the manner of application of the blank shown in Figure 2 and the cloth bag shown in Figure 3 to the stuffing tube.
Figure 5 is a view of a packed casing.

Referring to Figure 5, the method of operation is as follows:—

The blank or sheet of casing material 3 of cellophane or the like is first wrapped about the stuffing tube 1 with its edges 5 and 6 in overlapping relationship. At this point the cloth bag 4 is drawn over the tube 1 and the encircling blank 3, the tube fitting sufficiently snugly over the encircling blank 3 to hold the same on the tube 1. The open end 7 of the bag 4 is preferably drawn up close to the stuffing machine so that it fully encloses the encircling blank of casing material 3. The casing is then ready to be packed, and meat is forced through the tube 1 into the casing. It first contacts with the closed end of the bag 4, or, if desired, the blanks 3 may be folded over or tied at the open end of the tube so as to provide a closed end for the casing. In either event, the meat is impelled against the restraining action of the closed end of the bag 4 and as the meat is forced through the tube 1 the bag 4, together with the casing blank 3, is moved forwardly on the tube. As the meat commences to fill up the casing blank 3, the walls of this blank are expanded outwardly and limited in their expansion by the bag 4. Since the blank 3 is of a moisture absorbent character, and further, since the meat contains various materials possessing adhesive properties, the free edges 5 and 6 of the blank become adhesively sealed as the casing is packed, by the presence of such materials forced therebetween during filling of the casing blank.

The cloth bag 4 acts during the packing period to yieldedly retain the casing 3 against rupture, since the casing will expand only to the extent of occupying the full volume of the bag 4. Any strain is, of course, thereafter transmitted to the bag 4. When sufficient meat has been pressed through the tube 1 to fill the casing, the same is removed from the end of the tube and may be, if desired, smoked or otherwise treated. In such instances, it is preferable, though not essential, to retain the casing in the bag 4 during the smoking treatment. After such treatment, the bag 4 can be removed from the casing, leaving the same in finished and sealed form, the removed bag being utilizable for further packing of additional casings.

It will be understood that only moisture absorbent materials are desirable for use as casing blanks in this process. I have found parchment paper and "cellophane" especially adaptable for use in the process as casing blanks, and preferably use "cellophane" of a moisture-absorbing character.

If and when parchment paper is used as the casing, the meat contacting surface thereof should be first coated with lard, a vegetable oil or the like to render the casing readily removable from the finished meat pack.

It is fully appreciated that pre-formed casings have been made for purposes of packing meat and the like. I have, however, provided a process by which blank materials may be utilized in the packing of meat and the casing formed and sealed during the packing operation.

From the foregoing description, it is furthermore evident that by the use of my method the casing is prevented from being ruptured during the packing operation, and, further, that the same is of a self-sealing character.

This process has been in extensive use for some time, and the packed casings are so perfectly sealed that the joint between the meeting edges is located only with difficulty. The meat pack is exceedingly sanitary and is produced in a most economical manner, the preformation of casings being entirely obviated; and, furthermore, the difficulty of rupturing incident to packing pre-formed casings of this character is overcome.

Having thus described my invention, what I claim is:—

1. A process for packing ground meat in casings, comprising bringing a moisture absorbing sheet into position to receive a charge of meat with its free edges in overlapping but unsealed relationship, yieldingly restraining the rolled sheet against expansion to prevent said free edges from moving completely out of overlapping relationship and forcing meat into the rolled sheet and between the overlapping free edges thereof to a degree adequate to fill the casing formed from the rolled sheet and seal the free edges together.

2. A method for packing ground meat in casings, comprising initially wrapping a meat receiving sheet around a stuffing tube with the free unsealed edges thereof in overlapping relationship, then drawing a flexible bag over said rolled sheet and tube to hold the rolled sheet in position to receive the meat and to limit the expansion of said rolled sheet to prevent the free unsealed edges thereof from moving completely out of overlapping relationship, thereafter forcing meat through said stuffing tube into the rolled sheet and between the overlapping edges thereof to a degree sufficient to fill the rolled sheet and seal the overlapping edges together.

GEORGE C. GOCHNAUER.